INVENTOR
Hugo Purat.
BY
Harness, Dickey & Pierce
ATTORNEYS.

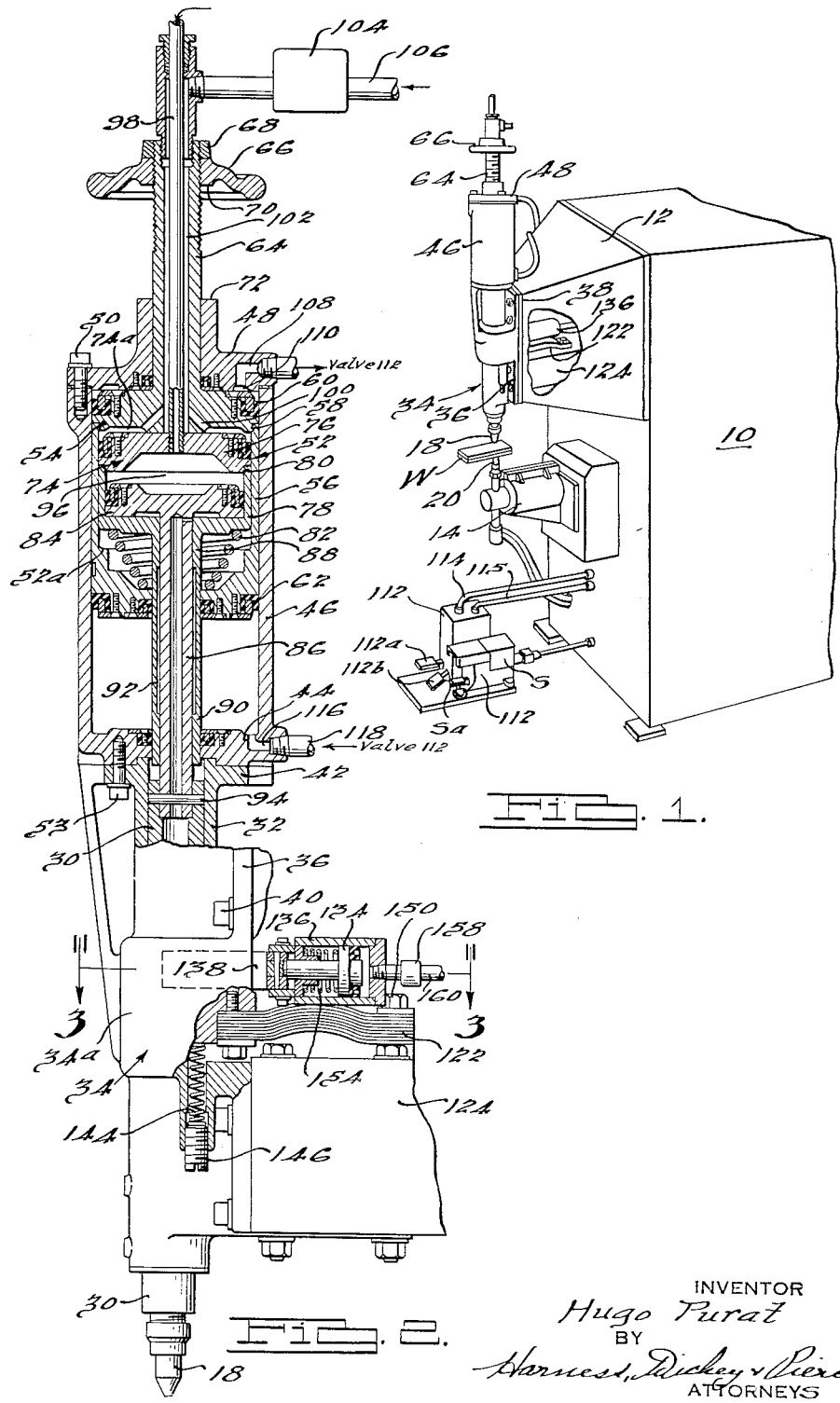

Patented Sept. 26, 1944

2,358,826

UNITED STATES PATENT OFFICE 2,358,826

WELDING MECHANISM

Hugo Purat, Detroit, Mich., assignor to Progressive Welder Company, Detroit, Mich., a corporation of Michigan Application May 19, 1941, Serial No. 394,118

4 Claims. (Cl. 219—4)

The present invention relates to welding mechanisms, and in particular is directed to the provision of an improved mechanism for controlling relative movements of and the operating pressures between the electrodes of a spot welding machine.

The principal objects of the present invention are to provide a mechanism of the above generally indicated type, which is simple in construction, economical of manufacture and assembly, and which is reliable and efficient in operation; to provide such a mechanism characterized as embodying means for limiting the pressure between the electrodes to a predetermined but adjustable value; to provide such a mechanism in which the welding pressure is transmitted to a movable electrode, from an associated source of power, through an intermediate chamber which is adapted to be charged with a compressible fluid and which limits the pressure applied to the movable electrode; to provide such a mechanism wherein the just-mentioned fluid chamber is embodied within a primary ram, which may be selectively actuated between a retracted loading position and an intermediate position and a welding position in which the movable electrode engages the work with the predetermined pressure; to provide such a mechanism wherein the primary ram comprises a cylinder and a primary piston movable therein, the primary piston being organized to accommodate a secondary piston, which secondary piston functions after operation of the primary piston to advance the movable electrode from the intermediate position to the welding position; to provide such a mechanism wherein the aforesaid pressure limiting means is interposed between the secondary piston and the movable electrode; to provide such a mechanism wherein the pressure limiting means is constituted by a chamber formed between the secondary piston and a third piston, which chamber is adapted to be charged with a compressible fluid; to provide such a mechansim embodying improved means for forming a clamping connection between a supply conductor and the movable electrode; and to generally improve welding mechanisms of the above generally indicated type.

Further objects of the present invention are to provide a mechanism of the above generally indicated type, wherein a fluid or elastic coupling of the above indicated type between a welder and its actuating mechanism enables the actuating mechanism to continue to move after the electrode has engaged the work; and to provide such a mechanism embodying control means for causing the flow of welding current to occur during the final movement of the actuating mechanism so as to facilitate the take-up movement of the welder which occurs as a consequence of the softening of the metal.

With the above, as well as other objects in view, which appear in the following description and in the appended claims, a preferred but illustrative embodiment of the invention is shown on the accompanying drawings, throughout the several views of which corresponding reference characters are used to designate corresponding parts and in which:

Figure 1 is a perspective view of a welding machine embodying the invention;

Fig. 2 is an enlarged view, partly in section, showing the invention;

Figure 3:
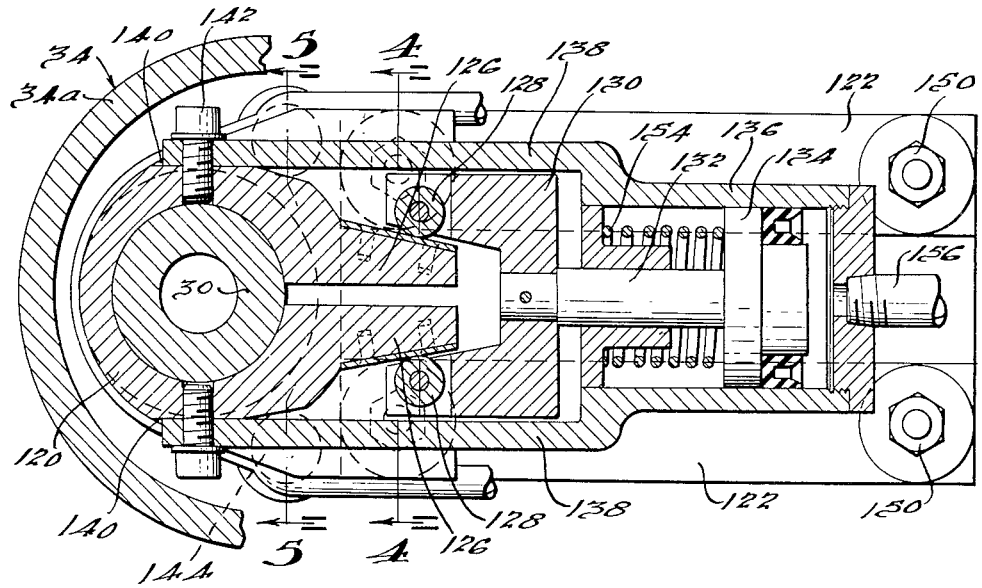
Fig. 3 is a view in section, taken along the line 3—3 of Fig. 2.

It will be appreciated from a complete understanding of the present improvements that in a generic sense they may be embodied in machines intended for widely varying types of service. A preferred use of the inventtion is in connection with the control of the movements of the movable electrode of a spot welding machine and the control of the pressure transmitted through the work by the movable and stationary electrodes of such machines. Accordingly, in an illustrative but not in a limiting sense, the invention is so illustrated herein.

Referring to the drawings, the illustrative machine comprises a main generally box-like frame 10, having upper and lower horns 12 and 14 projecting in vertically spaced relation from the front wall thereof. The upper horn 12 affords a support for the hereinafter described supporting and actuating mechanism, associated with the movable electrode 18, and the lower horn 14 constitutes a support for the lower or stationary electrode 20. To the extent thus far described, the welding machine is conventional and it will be understood that the work illustrated as comprising a pair of metallic sections W may be interposed between the electrodes 18 and 20, after which the same are brought into engagement with each other with a predetermined pressure. To complete the welding operation, current is caused to pass through the work and the electrodes 18 and 20 for a predetermined welding period, after which the pressure is relieved from the electrodes 18 and 20, allowing the work to be removed therefrom.

In accordance with the present invention, the movable electrode 18 is removably secured to the lower end of a column 30 which receives vertical guiding support from and is vertically slidable within a cylindrical guiding portion of a bracket 34. The rear face of the bracket 34 is provided with a transversely and vertically extending supporting plate or flange 36, which is adapted to seat against a corresponding portion 38 provided at the forward end of the upper horn 12. The bracket 34 is adapted to be secured in place on the horn 12 by means of a plurality of studs 40.

The upper end of the bracket 34 is provided with an annular flange 42, which forms a seat for the lower end 44 of the primary cylinder 46. The upper end of the cylinder 46 is closed by means of a removable cover plate 48. A series of studs such as 50 may be utilized to secure the cover plate 48 in place and a corresponding series of studs 53 may be utilized to secure the cylinder 46 to the bracket 34.

The cylinder 46 slidably receives a primary piston 52, which in itself constitutes a secondary cylinder and is composed of a head 54 and an upwardly presenting cuplike body 56. The members 54 and 56 are threadably secured to each other, as indicated at 58, and conventional sealing gaskets such as 60 and 62 may be utilized to prevent leakage of the actuating fluid around the primary piston 52. The member 54 is provided with an integral upwardly extending sleeve 64, which slidably passes through the cylinder head 48 and carries a motion limiting member illustrated as being a rotatable hand wheel 66, having a lock nut 68 associated therewith. As will be understood, by releasing the lock nut 68, the hand wheel 66 may be turned so as to cause it to travel upwardly or downwardly relative to the sleeve 64. In operation, as hereinafter described, the under surface 70 of the hand wheel seats against the upper surface 72 of the cylinder head 48 to limit the downward movement of the primary piston 52 and thus determine the location of the hereinafter described intermediate position of the movable electrode 18. In the retracted position of the movable electrode 18, the upper end of the primary piston 52 engages the underside of the cylinder head 48, which engagement thus determines the location of the retracted or loading position of the machine.

The primary piston 52 slidably receives a secondary piston 74, which is constituted by a head 76 and an upwardly presenting cuplike member 78. The members 76 and 78 are threadably secured to each other, as indicated at 80, and are continuously urged to the illustrated position in which the head 76 bears against the underside of the head 54 by means of a compression spring 82. The spring 82 is seated between the underside of the member 78 and the upper surface of the primary piston member 56.

The secondary piston 74 constitutes a cylinder which slidably receives a tertiary piston 84, which is provided with an integral downwardly projecting piston rod 86. The piston rod 86 is guidingly supported by the cooperating bearing portions 88 and 90, which are formed within the tubular piston rod 92. The piston rod 92 is integral with and projects downwardly from the secondary piston 74 and slidably passes through an opening provided therefor in the lower end 44 of the primary cylinder 46. The lower end of the piston rod 86 is rigidly but separably connected to the previously mentioned column 30 by means of a drive pin 94.

The chamber 96, which is formed within the secondary piston 74, constitutes a pressure limiting means or fluid lock, as hereinafter described, to determine the maximum pressure which may be transmitted to the work through the electrode 30, and this chamber is continuously connected to a suitable source of fluid, such as air, at a uniform pressure, through a tubular connection 98, which projects downwardly through, but in freely spaced relation to the walls of, the sleeve 64. The lower end of the connection 98 is threadably secured to the piston member 76 and opens directly into the chamber 96.

The actuating fluid for causing the secondary piston 74 to move downwardly is admitted to the portion 74a of cylinder 52, which is above the piston 74, through a plurality of angularly extending ports 100, which open into the just-mentioned chamber space, and also open into the annular space 102 between the sleeve 64 and the connection 98. The upper end of the just-mentioned annular space 102 is connected through a valve 104 to a line 106, which may extend to the same source of supply as is provided for the chamber 96.

Fluid is admitted to the primary cylinder 46 for the purpose of causing the primary piston 52 to move downwardly through a port 108, which opens into an annular groove 110 formed in the underside of the cylinder head 48. The port 108 is adapted to be controlled by a usual four-way valve 112 (Fig. 1).

Preferably and as illustrated, the primary piston 52 is returned to its retracted position by admitting air to the chamber space below piston 52 and for this purpose a passage 116 opens into the lower end of the cylinder 46 and is provided with a connection 118, which is also controlled by the valve 112.

It will be appreciated that, if desired, suitable reducing valves or other mechanism (not shown) may be interposed between the source of supply and the previously mentioned supply conduits 98, 106, 108, and 118, so as to afford desired relations between pressures exerted through these connections, and it will further be understood that flexible means (not shown) may be interposed between the conduit 98 and the source of supply so as to accommodate the hereinafter described reciprocating motion of the conduit 98.

It will further be understood that the valve 104 may be of the usual electromagnetically operated type, which in its de-energized position, closes off the connection between the passage 102 and the supply line 106 and connects such passage 102 to exhaust and which, in its energized position, closes off the just-mentioned exhaust connection and connects passage 102 to the supply line 106. Valve 112 is illustrated in Fig. 1 as being a conventional manually operable four-way valve, having pedals 112a and 112b. In the illustrated position in which pedal 112b is depressed, port 108 is connected to the associated exhaust line 115 and port 116 is connected to the supply line 114. It will be understood that if pedal 112a is depressed, the just-mentioned connections are reversed, port 116 being connected to the exhaust line 115 and port 108 being connected to the supply line 114.

Figures 4, 5:
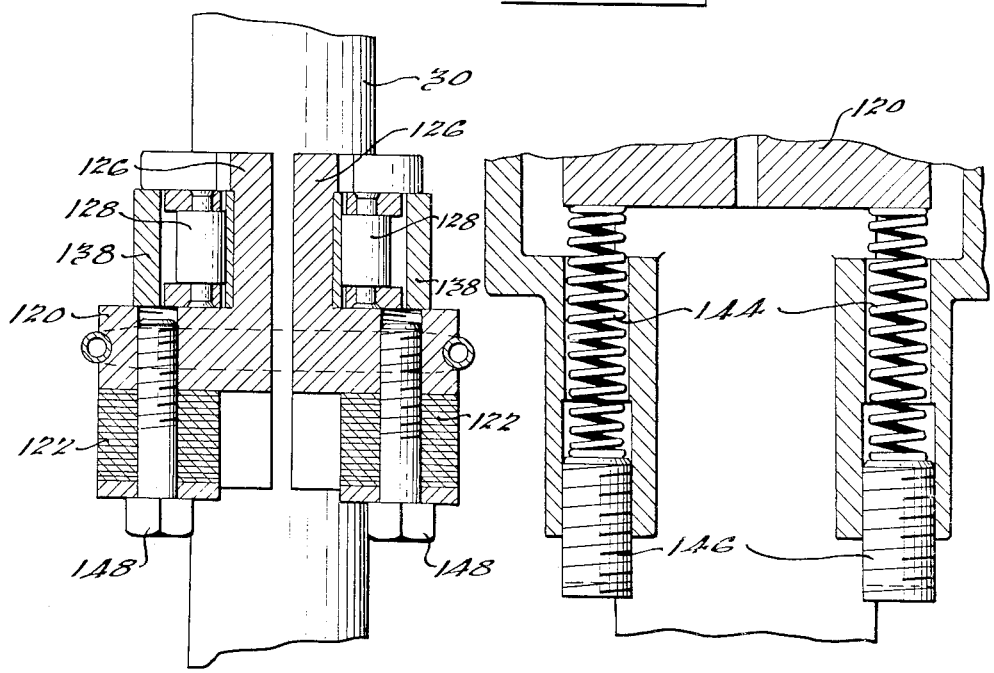
Fig. 4 is a view in section, taken along the line 4—4 of Fig. 3.
Fig. 5 is a fragmentary sectional view, taken along the line 5—5 of Fig. 3.

In accordance with the present invention, a clamping member 120 embraces the column 30, which carries the movable electrode 18, and may be selectively controlled to release the sleeve 32 or to clamp the same. The usual flexible leads 122, which connect the movable electrode to the corresponding terminal of the supply circuit, are connected to the clamp 120 and to the relatively stationary bus bar 124 which projects forwardly into the upper horn 12 of the machine. This clamping mechanism embodies certain improvements upon the corresponding arrangement described and claimed in my Patent No. 2,304,121 of December 8, 1942, and assigned to the assignee hereof. As shown, the clamping member 120 is of generally U-shaped form, having radially extending legs 126, the outer faces whereof are provided with tapered faces for wedging engagement with rollers 128, which are carried by a yoke 130. The yoke 130 is connected to a piston rod 132 associated with a piston 134, which is reciprocable within a cylinder 136. The cylinder 136 is provided with forwardly extending legs 138, the outer ends whereof are seated upon shoulders 140 provided at the respectively opposite sides of the clamp 120. Studs 142 are threaded through the arms 138 and into the body of the clamp 120, and serve to rigidly secure the cylinder 136 to the clamp. The clamp 120 is yieldingly supported from the adjacent portion 34a of the previously mentioned bracket 34, by means of a pair of oppositely disposed compression springs 144, which are received in bores individual thereto. Adjusting screws 146 are threaded into the lower end of the just-mentioned bores and serve to adjust the tension of the springs 144. As clearly appears in Figs. 2, 3 and 4, two of the previously mentioned flexible connectors 122 are employed, and are arranged at respectively opposite sides of the clamping assembly. The outer end of each flexible connector is secured to the clamp 120 by means of an associated stud 148 and the other end of each flexible connector is secured to the previously mentioned bus bar 124 by means of an associated stud 150.

It will be appreciated that the clamp 120 is formed of spring-like material and tends to assume an expanded position in which the sleeve 30, which carries the electrode 18, can freely move upwardly and downwardly relative to the clamp 120. The tendency of the clamp 120 to expand may be relied upon to urge the piston 134 to its righthand position, but preferably and as illustrated, a compresison spring 154 is provided for this purpose. Air or other suitable elastic fluid is admitted to the cylinder 134 through a connector 156. The connector 156 may be connected to the previously mentioned source of fluid pressure, through a valve 158, by means of a connector 160. It will be appreciated that the valve 158 may be of the type previously described in connection with valve 104.

Considering now the operation of the system as a whole, it will be appreciated that the parts are shown in the various figures in the retracted positions thereof, under which conditions, as previously mentioned, the primary piston 52 is maintained in its elevated position by the fluid pressure admitted through the line 118, the piston 74 is maintained in its elevated position by the spring 82, and the piston 84 is maintained in its illustrated position by the fluid pressure continuously admitted to the chamber 96 through the line 98. It may be assumed that the workpieces to be welded require the making of a plurality of separate spot welds, and such workpieces may be introduced into the space between the electrodes 18 and 20 while the latter are in relatively widely spaced relation to each other. As soon as the workpieces are properly located, as just-mentioned, pedal 112a of valve 112 may be operated to admit operating fluid to the passage 108, which thereupon builds up a pressure within cylinder 46, and to connect line 118 to exhaust. The building up of the just-mentioned pressure causes the primary piston assembly to move downwardly, as viewed in Figs. 1 and 2, until such a time as the underside of the hand wheel 66 engages the seat 72 provided therefor on the cylinder head 48. The just-mentioned limit is, as previously mentioned, adjustable and is preferably set to interrupt the movement of the primary piston 52 at a time when the movable electrode 18 is of the order of three-eighths of an inch from the work.

To initiate a welding operation, the valves 104 and 158 may be operated in sequence, and for this purpose the switch S (Fig. 1) may be depressed. The control mechanism for causing the operation of valves 104 and 158, in response to the operation of switch S and for also causing the flow of welding current in response to the same operation, may be variously arranged. A preferred arrangement is shown in my patent abovementioned. In utilizing the just-mentioned control system, the switch designated P in the patent corresponds to the switch S mentioned above, and the valves designated 54 and 106 in the patent correspond, respectively, to the valves 104 and 158 of the present application.

The operation of valve 104 admits fluid pressure through the passage 102 and the passages 100 into the previously identified chamber space 74a above the secondary piston 74, and as the pressure builds up in this chamber, secondary piston 74 is caused to move downwardly in opposition to the force of the compression spring 82. Under the conditions stated, a fluid pressure, proportional to the pressure supplied through the line 98, exists within the fluid lock chamber 96 and this pressure causes the tertiary piston 84 to move downwardly simultaneously with the secondary piston 74 until such time as the movable electrode 18 engages the work.

As soon as the movable electrode 18 engages the work, further downward movement thereof is interrupted and thereupon, as described in the patent, the valve 158 is operated to admit fluid pressure to the cylinder 136 and actuate the clamp 120 into clamping engagement with the sleeve 30, associated with electrode 18. The latter action electrically connects the electrode 18 to the bus bar 124, and as soon as this is accomplished, the welding circuit may be completed to initiate the flow of welding current.

As will be appreciated, the downward movement of the secondary piston 74 may continue after the movement of the tertiary piston 84 is interrupted, a lower limit to such downward movement being reached when the underside of piston 74 engages a cooperating annular shoulder 52a provided therefor adjacent the base of the primary piston 52. This limit is reached before the underside of the head 76 of piston 74 engages the upper surface of the tertiary piston 84, so that under all conditions of operation, the maximum pressure transmitted to the electrode 18 is determined by the pressure supplied through the line 98. Preferably, the parts are proportioned to allow for approximately five-eighths of an inch of movement of the secondary piston 74 after the movement of the tertiary piston 84 is interrupted.

As will be understood, the flow of welding current through the work softens the same and allows some take-up of the metal. The pressure within the chamber 96 produces the just-mentioned take-up movement of the electrode 18 without altering the pressure between the electrodes. This take-up movement causes a corresponding slight downward movement of the clamp 120, which slight downward movement is permitted by the flexible character of the connectors 122, as will be understood. This downward movement of the clamp 120 also loads the supporting springs 144, associated therewith, and renders them effective to restore the clamp 120 to its normal position as soon as the welding operation is completed.

At the conclusion of the welding operation, the flow of current is automatically interrupted, as described in the patent, after which the valves 158 and 104 are sequentially de-energized to first release the clamp 120 and to thereafter exhaust actuating fluid from the chamber 74a, associated with the secondary piston 74. As soon as the latter action occurs, piston 74 is restored to the upper position under the influence of spring 82 and carries with it the tertiary piston 84, thereby elevating the electrode 18 to the previously identified intermediate position. This intermediate position is high enough to allow the work to be moved to the next welding position, at which time the previously described sequence may be completed. As soon as all welding operations on the workpiece in question are accomplished, the pedal 112b of valve 112 may be depressed, thereby exhausting that portion of cylinder 46 which is above piston 52, and admitting fluid pressure through line 118, which actions restore the primary piston to the position shown in Fig. 2.

As previously mentioned, the flow of welding current through the work softens the same and allows some take-up of the metal. It is important that the pressure between the movable and stationary electrodes be accurately controlled throughout the period during which the welding current is flowing, and it is, therefore, essential to initiate a take-up movement of the movable electrode as soon as the metal starts to soften and that such take-up movement continue throughout the softening period. In welding certain classes of metal, such as aluminum, aluminum alloys, stainless steels, and the like, satisfactory welding operations depend upon the use of exceedingly high welding current values and extremely short periods of current flow. For example, the system of the aforesaid patent is arranged to limit the flow of current to one half-cycle of the source, which, with a sixty cycle system, is equivalent to $\frac{1}{120}$ of a second. At the beginning of this fraction of a second, the movable electrode stationarily engages the surface of the work, and during the course thereof must be started on its take-up movement. In the present arrangement, as aforesaid, the secondary piston 74 is enabled to continue its downward movement after the movable electrode 18 has engaged the work, and in accordance with the present invention, the parts are preferably so adjusted that the secondary piston 74 remains in motion throughout the period during which the welding current is flowing. With this relation, the frictional engagement between the tertiary piston 84 and the secondary piston 74 tends to cause the tertiary piston 84 to advance toward the work. Consequently, as soon as the metal starts to soften, the already moving secondary piston 74, together with the fluid pressure existing in the chamber 96, is enabled to immediately begin the take-up movement of the tertiary piston 84 and the movable electrode 18.

As previously mentioned, it is customary and the aforesaid patent system is arranged to maintain the pressure between the movable and fixed electrodes for a certain period after the flow of current is interrupted, and it is to be expected that the secondary piston 74 will reach its lower limit of travel sometime during the just-mentioned period. In all cases, however, the adjustment is such that the secondary piston 74 be provided with a sufficiently long stroke so as to maintain this piston in motion throughout the period in which the take-up movement of the movable electrode occurs. Throughout the entire take-up movement of the movable electrode, therefore, the secondary piston is effective to cooperate with the elastic pressure in the chamber 96, to cause the take-up movement of the movable electrode 18 to promptly follow the softening of the metal.

Although only a single specific embodiment of the invention has been described in detail, it will be appreciated that various modifications in the form, number and arrangement of parts may be made without departing from the spirit and scope of the invention.

What is claimed is:

1. In a machine having a work engaging part, a piston connected to said part, a first cylinder within which said piston is received, means for moving said cylinder, means for introducing an elastic fluid at controllable pressure into said cylinder so as to urge said piston to move said part to work engaging position as said cylinder is moved, said elastic fluid enabling said cylinder to continue to advance after said part has reached said work engaging position, said moving means including a second cylinder for slidably receiving said first cylinder, and means for applying a fluid pressure between said first and second cylinders so as to cause said movement of said first cylinder.

2. In a machine having a movable part, a primary cylinder, a primary piston slidably received in said primary cylinder and formed to define a cylinder space, a secondary piston received in said last-mentioned cylinder space and formed to define a cylinder space, a tertiary piston slidably received in said last-mentioned cylinder space, means for continuously introducing an elastic fluid into said last-mentioned cylinder space so as to act against said tertiary piston, selectively controllable means for introducing fluid pressure into said first-mentioned cylinder and into the cylinder space provided in said first-mentioned piston, and means directly connecting said part to said tertiary piston.

3. In a machine having a movable part, a primary cylinder member, a primary piston slidably received in said primary cylinder member and formed to define a cylinder space, a secondary piston member received in said last-mentioned cylinder space, means for continuously introducing an elastic fluid into said last-mentioned cylinder space so as to act against said secondary piston member, selectively controllable means for introducing fluid pressure into said first-mentioned cylinder space, means connecting one of said members to said movable part, and means for supporting the other of said members.

4. In a machine having a movable part, a primary cylinder member, a primary piston slidably received in said primary cylinder member and formed to define a cylinder space, a secondary piston member received in said last-mentioned cylinder space, means for continuously introducing an elastic fluid into said last-mentioned cylinder space so as to act against said secondary piston member, selectively controllable means for introducing fluid pressure into said first-mentioned cylinder space, means connecting one of said members to said movable part, and means for supporting the other of said members, said last-mentioned means including a cylinder member within which said primary cylinder member is slidably received, and selectively controllable means for introducing fluid pressure into said last-mentioned cylinder to act against said primary cylinder member.

HUGO PURAT.